United States Patent
Levonas et al.

(10) Patent No.: US 9,185,204 B2
(45) Date of Patent: Nov. 10, 2015

(54) METHOD AND APPARATUS FOR DESIGNING AN IMPROVED TRANSMIT SIGNAL FOR USE IN A SINGLE ENDED LINE TEST (SELT)

(71) Applicant: IKANOS COMMUNICATIONS, INC., Fremont, CA (US)

(72) Inventors: Robin Levonas, Holmdel, NJ (US); Vipin Pathak, Eatontown, NJ (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 0 days.

(21) Appl. No.: 14/339,862

(22) Filed: Jul. 24, 2014

(65) Prior Publication Data
US 2015/0030137 A1   Jan. 29, 2015

Related U.S. Application Data

(60) Provisional application No. 61/859,509, filed on Jul. 29, 2013.

(51) Int. Cl.
*H04M 1/24* (2006.01)
*H04M 3/08* (2006.01)
*H04M 3/22* (2006.01)
*H04M 3/30* (2006.01)

(52) U.S. Cl.
CPC ............ *H04M 3/2209* (2013.01); *H04M 3/306* (2013.01)

(58) Field of Classification Search
CPC .............. H04B 3/46; H04B 7/00; H04B 3/32; H04L 1/00; H04L 1/0002
USPC ............... 379/1.01, 1.03, 1.04, 12, 22, 22.01, 379/22.02, 22.03, 22.04, 22.08, 24, 27.01, 379/29.01, 28, 27.03; 375/222, 223, 224
See application file for complete search history.

(56) References Cited

U.S. PATENT DOCUMENTS

| | | | |
|---|---|---|---|
| 6,646,994 B1 * | 11/2003 | Hendrichs et al. | 370/252 |
| 7,583,727 B2 * | 9/2009 | Rekai et al. | 375/225 |
| 8,385,510 B2 * | 2/2013 | Berg et al. | 379/1.04 |
| 2002/0110118 A1 * | 8/2002 | Foley | 370/352 |
| 2003/0095591 A1 * | 5/2003 | Rekai et al. | 375/225 |
| 2004/0101130 A1 | 5/2004 | Shi et al. | |
| 2006/0095565 A1 | 5/2006 | Rhee et al. | |
| 2006/0251160 A1 * | 11/2006 | Fazlollahi et al. | 375/222 |
| 2011/0110409 A1 | 5/2011 | Sands et al. | |
| 2012/0263216 A1 | 10/2012 | Belge et al. | |
| 2013/0142315 A1 | 6/2013 | Belge et al. | |
| 2014/0023127 A1 * | 1/2014 | Pereira | 375/224 |
| 2014/0105262 A1 * | 4/2014 | Alloin et al. | 375/222 |

OTHER PUBLICATIONS

International Search Report issued Nov. 6, 2014 in corresponding PCT/US14/048056.

* cited by examiner

*Primary Examiner* — Binh Tieu
(74) *Attorney, Agent, or Firm* — Pillsbury Winthrop Shaw Pittman LLP

(57) ABSTRACT

The present invention relates to methods and apparatuses of using a novel transmit signal that can be used to improve performance of various loop diagnostic features of SELT. In embodiments, a novel transmit signal uses a wide contiguous band of tones that includes frequencies in both upstream and downstream bands. In these and other embodiments of the invention, the SELT transmit signal is designed such that any crosstalk noise in adjacent lines appears as a burst of noise that falls within the limits of the FEC settings of the system such that it can be fully corrected without harming the performance of modems connected on the adjacent lines.

20 Claims, 5 Drawing Sheets

METHOD AND APPARATUS FOR DESIGNING AN IMPROVED TRANSMIT SIGNAL FOR USE IN A SINGLE ENDED LINE TEST (SELT)

CROSS-REFERENCE TO RELATED APPLICATIONS

The present application claims priority to U.S. Prov. Appln. No. 61/859,509 filed Jul. 29, 2013, the contents of which are incorporated herein by reference in their entirety.

FIELD OF THE INVENTION

The present invention relates generally to xDSL communication systems, and more particularly to methods and apparatuses for performing single ended line tests with a wideband transmit signal.

BACKGROUND OF THE RELATED ART

In a typical xDSL deployment, a Central Office (CO) side transceiver will communicate with a compatible unit located at the Customer Premise (CP) known as the CP device or equipment (CPE). The service provider can, at times, run diagnostic tests to determine if there have been any changes to, or impairments in, the loop environment since the last diagnostic test was run or if the current line is capable of supporting higher data rates through use of a different xDSL standard, for example, using VDSL versus ADSL. One popular diagnostic test that aims at making such determinations is SELT.

A SELT test consists of transmitting a known test signal and analyzing the return, or echo, signal seen at the transceiver input. The transmit signal will undergo shaping as it traverses the loop. This shaping is representative of the loop characteristics. For example, if a bridge tap is present somewhere on the line under test, a SELT test may be able to identify this through knowledge of the unique signature that a bridge tap presents to the line when probed with a SELT test signal.

Since both ends of the connection are capable of transmitting a SELT signal, either side can run a SELT test. There are advantages to running SELT at one side or the other side of the connection. For determining the loop characteristics of in-home wiring, for example, execution of the SELT test from the CP side is desirable. Conversely, identification of loop impairments in close proximity to the central office is best seen through a CO side SELT test. In either event, since the SELT transmit signal undergoes attenuation that is proportional to the length of loop that it traverses, there are practical limits to which this test can be effectively used to determine the presence of loop wiring impairments.

Accordingly, there remains a need for improved SELT test techniques that address these shortcomings, among others.

SUMMARY OF THE INVENTION

The present invention relates to methods and apparatuses of using a novel transmit signal that can be used to improve performance of various loop diagnostic features of SELT. In embodiments, a novel transmit signal uses a wide contiguous band of tones that includes frequencies in both upstream and downstream bands. In these and other embodiments of the invention, the SELT transmit signal is designed such that any crosstalk noise in adjacent lines appears as a burst of noise that falls within the limits of the FEC settings of the system such that it can be fully corrected without harming the performance of modems connected on the adjacent lines.

In furtherance of these and other aspects, a method for examining a line coupled to a modem in a discrete multi-tone (DMT) communications system according to embodiments of the invention includes transmitting from the modem a test signal using tones in both upstream and downstream frequency bands of the DMT communications system, receiving a reflection of the test signal at the modem, and analyzing the reflection to identify impairments in the line.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, embodiments of the invention involve the use of a novel SELT transmit signal that is able to more effectively detect and characterize loop impairments. According to certain additional aspects, embodiments of the invention use a high bandwidth SELT transmit signal that is designed to avoid the adverse effects of potentially disturbing adjacent xDSL lines with crosstalk that could result in bit errors.

Figure 1:
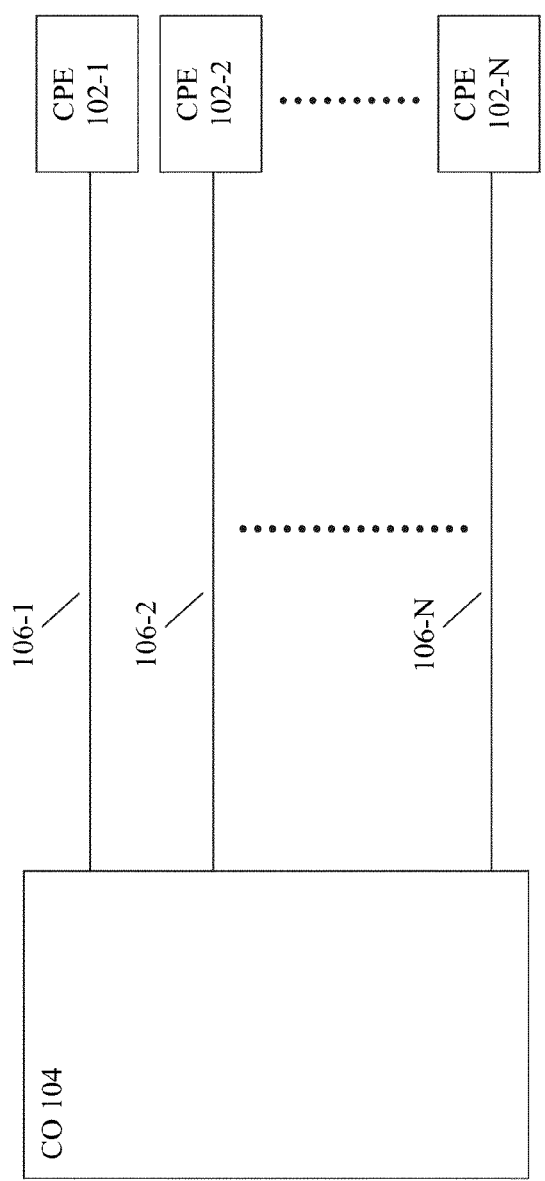
FIG. 1 is a block diagram illustrating an example system in which embodiments of the invention can be implemented.

FIG. 1 is a block diagram illustrating an example system 100 in which embodiments of the invention can be implemented. As shown in FIG. 1, a plurality of N CPE transceivers 102-1 to 102-N are coupled to a CO 104 via respective loops 106-1 to 106-N. In one non-limiting example, system 100 can be a DSL system operating according to VDSL2, in which certain or all of transceivers 102-1 to 102-N are configured as a vectoring group by CO 104. However, the invention is not limited to this example.

As set forth above, in wired communication systems (such as DSL, cable modem etc.) loop diagnostics are often based on analyses of SELT data. For example, CPE 102-1 can perform diagnostics to characterize loop 106-1 using SELT signals transmitted by CPE 102-1 on loop 106-1 and reflected back to CPE 102-1. Specifically, in an example wherein system 100 is operating according to VDSL2, a conventional SELT performed by CPE 102-1 can include continuously transmitting symbols (e.g. modulated REVERB symbols) each VDSL2 symbol period (i.e. at a rate of 4 kHz) for an elapsed time of about 5 seconds to about 2 minutes, and measuring the reflections (i.e. obtaining S11 data) from loop 106-1. It should be noted that some or all of the other CPE's 102-2 to 102-N can be operating in Showtime using the same symbol periods while CPE 102-1 performs its SELT tests.

Figure 2:
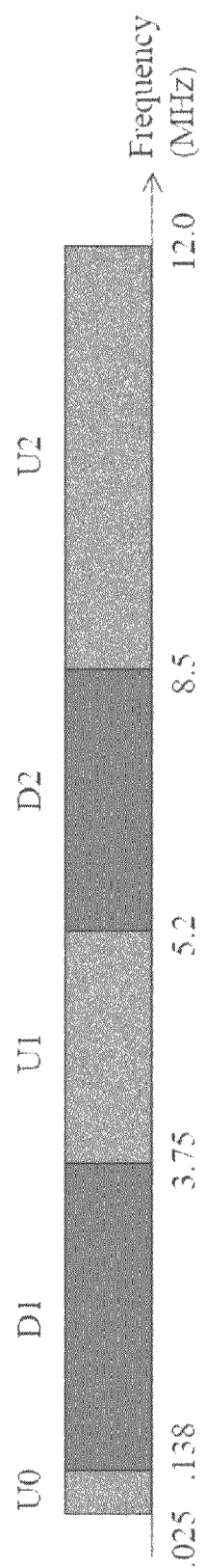
FIG. 2 is a diagram illustrating an example band plan for which SELT signals according to embodiments of the invention can be adapted.

The present inventors recognize that in conventional systems such as VDSL2, the CPE is assigned certain frequency bands in which they are permitted to transmit upstream signals according to a prescribed band plan. An example band plan such as that given in the G.993.2 standard is shown in FIG. 2. As shown, it includes three upstream bands U0 (comprising tones from 0.025 MHz to 0.138 MHz), U1 (comprising tones from 3.75 MHz to 5.2 MHz) and U2 (comprising tones from 8.5 MHz to 12.0 MHz) and two downstream bands D1 (comprising tones from 0.138 MHz to 3.75 MHz) and D2 (comprising tones from 5.2 MHz to 8.5 MHz).

By adhering to such a band plan, symbols constructed by CPE 102-1 and used in SELT can only use tones in the upstream bands U0, U1 and U2. As a result, conventional SELT S11 data is available only for signals using the upstream bands (e.g. U0, U1 and U2). Meanwhile, the present inventors recognize that, due to the banded structure of the conventional SELT signal, it is difficult to detect signatures of various loop impairments using either frequency domain (FDR) or time domain (TDR) analyses. For example, gaps in the FDR data make it difficult to look for patterns using a FDR analysis. Likewise, discontinuities in the S11 data create artifacts in the TDR signal and clutter the signatures associated with various loop impairments. Moreover, the present inventors further recognize that the amount and quality of information that can be extracted from a SELT test is, in part, a function of the bandwidth of the probing signal. Therefore, in addition to avoiding a banded approach, it is highly desirable to transmit a test signal that has a higher bandwidth than conventional SELT transmit signals.

In accordance with certain aspects, therefore, embodiments of the invention use a wideband SELT transmit signal. The use of a wideband signal is advantageous in the sense that it allows for the best possible resolution of wiring impairments as derived through SELT analysis. In embodiments, contrary to conventional SELT transmit signals, a SELT transmit signal according to the invention spans both the upstream and downstream frequency bands in bandplans for typical xDSL deployments such as that shown in FIG. 2.

Figure 3:
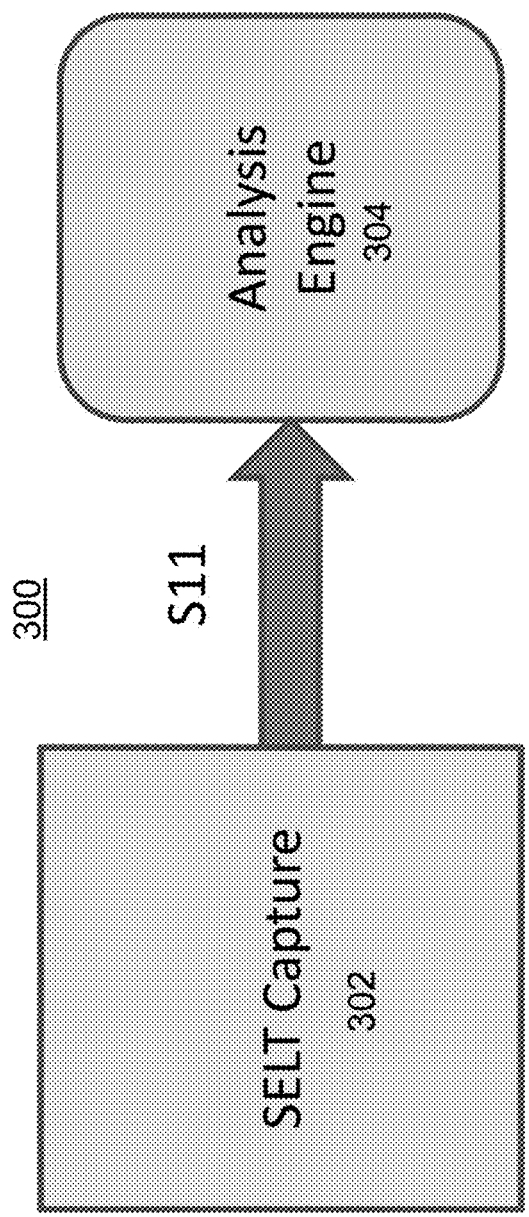
FIG. 3 is a block diagram illustrating an example loop diagnostics apparatus according to embodiments of the invention.

A block diagram illustrating an example apparatus for performing SELT according to embodiments of the invention is shown in FIG. 3. As shown, apparatus 300 includes a SELT capture block 302 and an analysis engine 304.

SELT capture block 302 includes functionality for forming SELT signals and transmitting the signals on the loop. In embodiments, the transmit signal is generated in a manner consistent with standard methods of generating a multi-carrier discrete multi-tone (DMT) signal, using the inverse Fast Fourier Transform (iFFT) algorithm, as defined in G.993.2. For example, embodiments of the invention construct DMT symbols such as modulated REVERB symbols and transmit them on the loop during regular symbol periods.

Contrary to DMT symbols used in conventional SELT test signals which can use only upstream bands from a CPE, however, the transmit signal modulates a contiguous set of tones that span both upstream and downstream bands in typical xDSL deployments. For example, embodiments of the invention construct DMT symbols occupying all tones in a wide frequency range from tone 6 (approximately 24 KHz) to tone 2800 (approximately 12 MHz). In these and other embodiments, the amount of energy mapped to each tone is the same, such that the transmit signal is spectrally "flat" over the contiguous set of modulated tones. Those skilled in the art will be able to adapt conventional SELT signal transmission schemes using the novel wideband SELT test signals of the invention after being taught by the present disclosure.

It should be noted that this range of frequencies is a very non-limiting example, and can depend on the particular type of xDSL deployment. For example, in a VDSL deployment spanning frequencies up to 17 MHz, the range of frequencies spanned by SELT signals according to embodiments of the invention can be between about 0 to about 2.2 MHz, between about 0 to 8.5 MHz or between about 0 to 17 MHz. Moreover, it is not necessary for every single tone within the transmit band to be used in all embodiments. For example, it is possible that every other tone or similar scheme can be used.

Returning to FIG. 3, SELT capture block 302 also includes functionality for measuring the reflections from the loop, and providing the S11 reflection coefficient (e.g. Rx/Tx frequency domain data) to analysis engine 304. Such measurement functionality of SELT capture block 302 can be implemented using techniques known to those skilled in the art, and so further details thereof will be omitted here for sake of clarity of the invention.

Analysis engine 304 receives the S11 reflection data from capture block 302. In embodiments, engine 304 analyzes the data using known and proprietary techniques to detect impairments in the line on which the SELT signals are transmitted and reflected by SELT capture block 302. In embodiments, engine 304 includes iFFTs to convert the S11 frequency domain data to a time domain signal and use TDR processing to analyze the time domain signal. Examples of the types of processing that can be performed by engine 304 include those described in co-pending U.S. application Ser. Nos. 14/341,538 and 14/341,576, as adapted to use the wideband SELT signals of the present invention, the contents of both applications being incorporated herein by reference.

In embodiments, apparatus 300 is incorporated in CPE transceivers 102. In these and other embodiments, CPE transceivers 102 (as well as transceivers in CO 104) include DSL transceivers (e.g. VX185 from Ikanos Communications, Inc.) having conventional processors, chipsets, firmware, software, etc. that implement communication services such as those defined by VDSL2, ADSL2, etc. using a band plan such as that shown in FIG. 2. Moreover in these and other embodiments, apparatus 300 can be implemented by adapting SELT functionality such as that provided by diagnostics suites such as inSIGHT provided by Ikanos Communications, Inc. Those skilled in the art will be able to understand how to adapt such processors, chipsets, firmware, software, etc. to implement the SELT functionalities of the present invention after being taught by the above and following examples.

It should be noted that in alternative embodiments, apparatus 300 can be incorporated in a standalone loop diagnostics and/or monitoring device, and those skilled in the art will also be able to implement these embodiments of the invention after being taught by the present disclosure.

It should be further noted that embodiments of the invention will be described in connection with SELT performed on a downstream end of lines 106 in or near CPE transceivers 102. However, the invention is not limited to this example, and such functionality can also be incorporated in or near transceivers at the CO end of lines 106.

Figure 4:
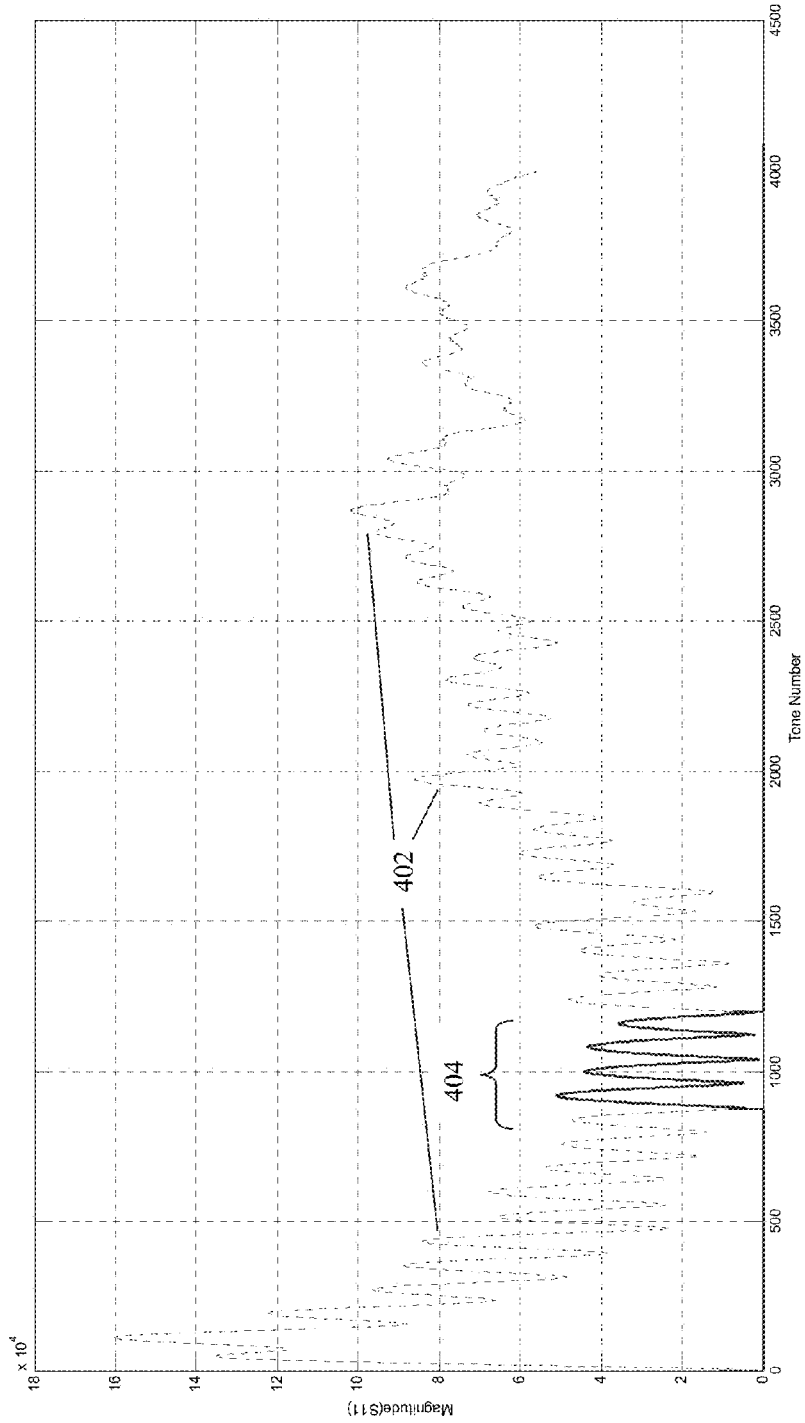
FIGS. 4 to 6 are plots of S11 data illustrating aspects and advantages of using a wideband SELT transmit signal according to embodiments of the invention.
Figure 5:
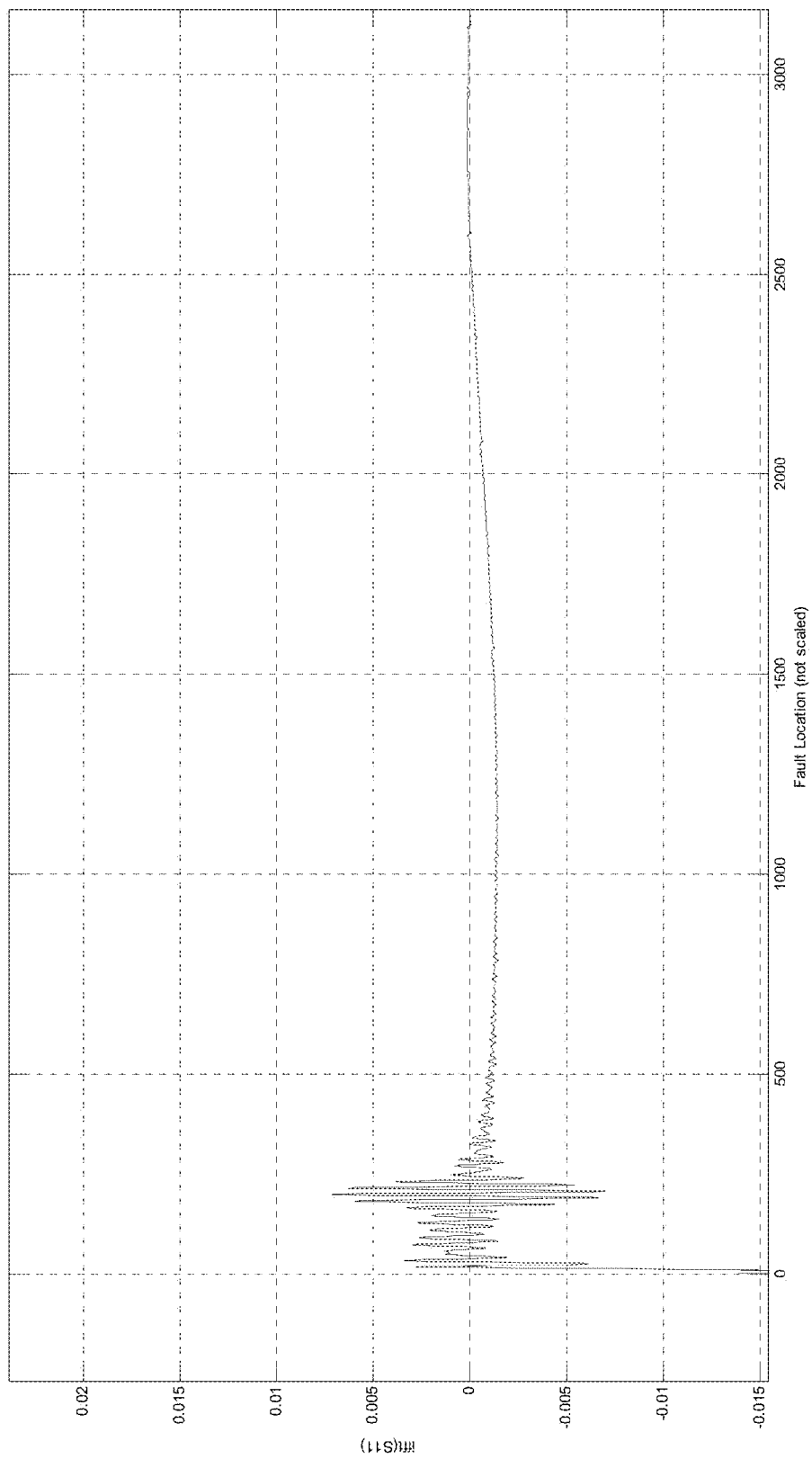
Figure 6:
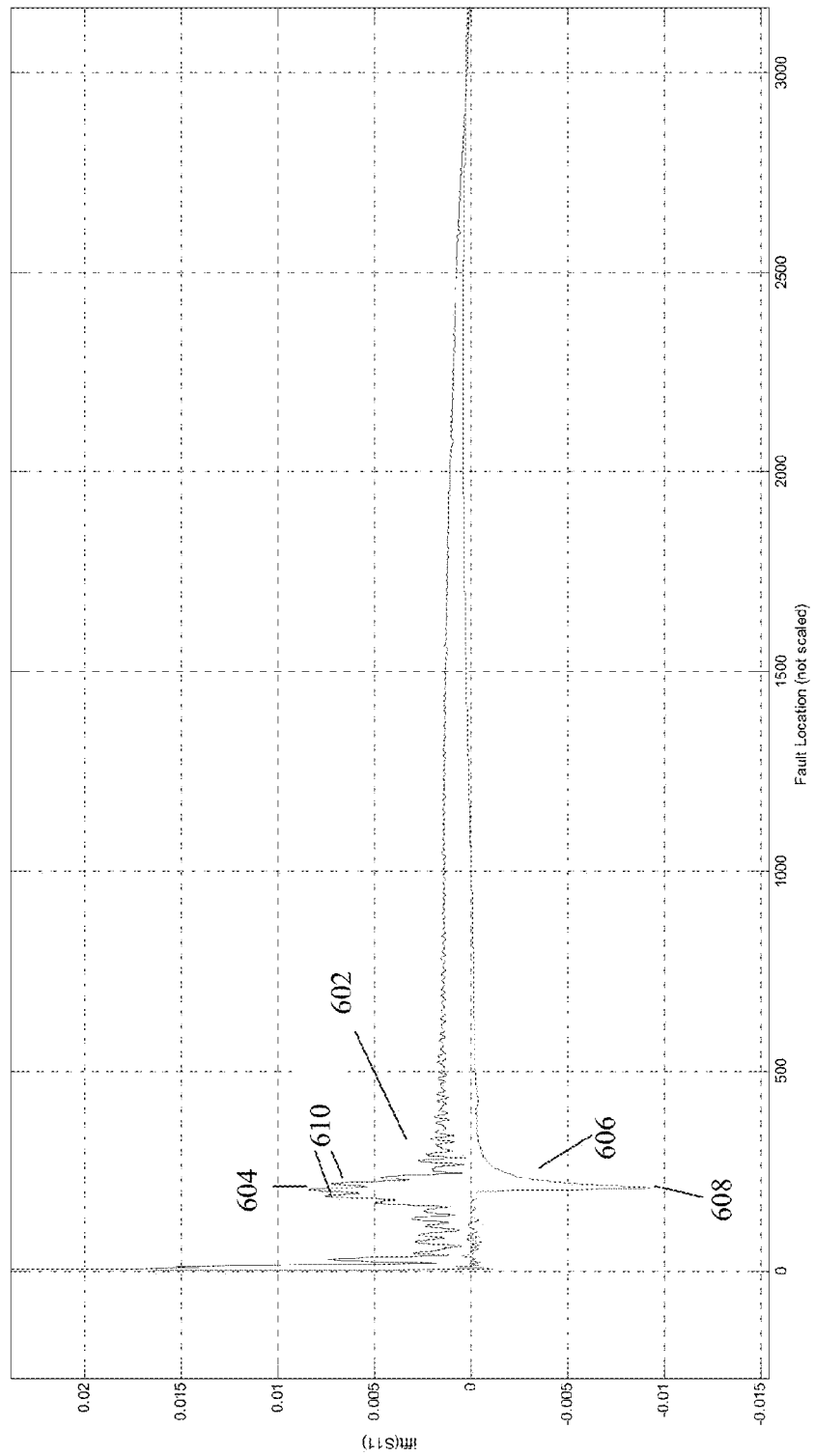

Aspects and advantages of apparatuses and methods using the wideband SELT signals according to embodiments of the invention will become even more apparent from the following descriptions in connection with FIGS. 4 to 6. More particularly, these examples contrast the use of a 17 MHz wideband SELT transmit signal according to embodiments of the invention with a transmit signal that spans only the VDSL2 US1 band according to prior art techniques, referred to here as a banded signal.

FIG. 4 provides a plot 402 of the magnitude of S11 resulting from a 17 MHz wideband transmit signal, with a plot 404 of the same for a US1 banded transmit signal overlayed thereon. In this example, the 17 MHz wideband signal of embodiments of the invention spans the frequency range from 4.3125 KHz to approximately 17 MHz whereas the banded signal only spans the range from 3.769 MHz (i.e. tone 874) to 5.175 MHz (i.e. tone 1200) and is equal to zero elsewhere.

As is known in the art, and as set forth above, certain characteristics of the loop under test can be characterized by transmitting a SELT signal, capturing and measuring the resultant S11 frequency domain data, and then performing an inverse Fourier transform on the S11 to derive the time domain equivalent of the frequency domain S11 data. Such a time domain signal will typically exhibit peaks at the points of discontinuity in the loop. So, by analyzing the peak information one can determine various characteristics of the loop.

FIG. 5 is a plot showing the real component of the resultant time domain signal associated with the US1 banded S11 after an inverse FFT operation has been performed on the S11 data. As can be seen here, the time domain signal is very noisy due to the fact that the frequency domain signal is effectively a passband signal and will therefore contain a carrier component when transformed via the IFFT. One operation to attempt to clean up the signal would be to apply a smoothing filter and also to take the magnitude of the IFFT output. This is shown in the plot 602 of FIG. 6. Here, the discontinuity at 1000 ft is apparent by the large peak 604 seen at x=200 (note that the x-axis in FIG. 6 is not calibrated to reflect the actual distance to the fault. This is an additional step in the post processing that would be performed at some point).

Also shown in FIG. 6 is a plot 606 showing the real component of the IFFT of the 17 MHz wideband signal. As can be seen here, the peak 608 is much sharper and much more defined than peak 604 of the US1 banded signal, which also contains spurious peaks 610 that can skew the actual location of the discontinuity. In addition, the polarity of the peak indicates that the loop impairment is a short circuit, as is evident by the negative going peak. This information is lost in the banded system.

According to further aspects, the present inventors recognize that while tests are being conducted and the wideband SELT signal is transmitted over the local loop according to embodiments of the invention (e.g. by CPE 102-1 in FIG. 1), these frequencies are coupled into adjacent lines 106 and will appear as noise to other CPEs 102 and/or transceivers in CO 104. This type of noise is referred to as cross-talk. Since these lines may also be provisioned with xDSL services, this noise could negatively impact the performance of the adjacent transceivers.

The present inventors further recognize that cross-talk interference is a well understood impairment in the area of xDSL. As such, the various xDSL standards define methods of forward error correction (FEC) coding whose goal is to combat the effects of burst noise, and other impairments, that can adversely affect the performance of an xDSL modem.

More particularly, according to certain aspects, embodiments of the invention rely on the fact that a typical standard compliant xDSL modem (e.g. CPE's 102 and/or transceivers in CO 104) will incorporate the use of Forward Error Correction (FEC) codes, as defined in the G.993.2, and like, standards. FEC codes can correct for bursts of noise so long as the noise is confined to a specific period or interval of time. If the noise burst falls within the limits of the FEC code, as it is configured, then the user will see no adverse effects in terms of modem bit error performance. In accordance with these and other aspects, embodiments of the invention design a SELT transmit signal such that it appears as a burst of noise that falls within the limits of the FEC code, and therefore can be fully corrected without harming the performance of modems connected on adjacent lines.

The transmit signal (e.g. formed by SELT capture block 302) will be turned on and off such that any coupled energy, in the form of crosstalk, will be fully corrected by the FEC code as configured in the adjacent modems 102. Since the service provider will have knowledge of the configuration parameters of the deployed modems, they can then configure a programmable user interface in the CPE 102 with the necessary control configuration. SELT capture block 302, having access to this interface, can then configure the transmitter at the rate at which to pulse the wideband SELT transmit signal.

For example, in a deployment shown in FIG. 1 where the downstream side modems in CPEs 102 have an INP (Impulse Noise Protection) setting of two symbols, then the CPE that transmits the wideband SELT signal will only transmit one symbol for every xDSL superframe, rather than in every symbol period as described above. The control of the transmitter is vendor discretionary, and can be accomplished, for example, by turning the analog front end line driver on and/or off by asserting the appropriate control bit, or by some other means.

This technique ensures that any coupled energy into adjacent lines 106 will be seen at the CPE 102 as an impulse burst that falls within the abilities of the FEC code to correct it.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for examining a line coupled to a modem in a discrete multi-tone (DMT) communications system in which symbols communicated once every consecutive symbol period, comprising:

constructing symbols using tones in both upstream and downstream frequency bands of the DMT communications system;

forming a test signal consisting of the constructed symbols in only certain non-consecutive portions of the symbol periods and silence in the remaining symbol periods;

transmitting from the modem the test signal on the line;

receiving a reflection of the test signal from the line at the modem; and analyzing the reflection to identify impairments in the line.

2. A method according to claim 1, wherein the reflection comprises frequency domain S11 data.

3. A method according to claim 1, further comprising converting the reflection to a set of time domain data.

4. A method according to claim 3, wherein analyzing includes identifying peaks in the set of time domain data.

5. A method according to claim 1, wherein the modem is a CPE modem and the upstream and downstream bands are two or more adjacent bands in a xDSL system frequency band plan.

6. A method according to claim 5, wherein the xDSL system is a vectored DSL system, and wherein transmitting is performed while one or more other lines in a vectored group including the line are operating in Showtime.

7. A method according to claim 6, wherein the certain non-consecutive portions of symbol periods results in the constructed symbols being transmitted at a rate corresponding to an error correction capability of the vectored DSL system.

8. A method according to claim 7, wherein the rate is a pulse of a number of symbols per DMT superframe.

9. A method according to claim 5, wherein the constructed symbols are REVERB symbols.

10. A method according to claim 1, wherein the tones are a contiguous set of tones spanning the upstream and downstream bands.

11. An apparatus for examining a line coupled to a modem in a DMT communications system in which symbols are communicated once every consecutive symbol period, comprising:

a SELT block that constructs symbols using tones in both upstream and downstream frequency bands of the DMT communications system, forms a test signal consisting of the constructed symbols in only certain non-consecutive portions of the symbol periods and silence in the remaining symbol periods, transmits from the modem the test signal on the line and receives a reflection of the test signal from the line at the modem; and an analysis engine that analyzes the reflection to identify impairments in the line.

12. An apparatus according to claim 11, wherein the reflection comprises frequency domain S11 data.

13. An apparatus according to claim 11, wherein the analysis engine converts the reflection to a set of time domain data to identify the impairments.

14. An apparatus according to claim 11, wherein the modem is a CPE modem and the upstream and downstream bands are two or more adjacent bands in a xDSL system frequency band plan.

15. An apparatus according to claim 14, wherein the xDSL system is a vectored DSL system, and wherein the SELT block transmits the test signal while one or more other lines in a vectored group including the line are operating in Showtime.

16. An apparatus according to claim 15, wherein the certain non-consecutive portions of symbol periods results in the constructed symbols being transmitted by the SELT block at a rate corresponding to an error correction capability of the vectored DSL system.

17. An apparatus according to claim 16, wherein the rate is a pulse of a number of symbols per DMT superframe.

18. An apparatus according to claim 17, wherein the number is one.

19. An apparatus according to claim 14, wherein the constructed symbols are REVERB symbols.

20. An apparatus according to claim 11, wherein the tones are a contiguous set of tones spanning the upstream and downstream bands.

* * * * *